US011203042B2

(12) United States Patent
Ragnarsson

(10) Patent No.: US 11,203,042 B2
(45) Date of Patent: Dec. 21, 2021

(54) ADJUSTMENT MECHANISM FOR GRADING SYSTEMS

(71) Applicant: STYLE EHF., Gardabaer (IS)

(72) Inventor: Egill Thor Ragnarsson, Kopavogur (IS)

( * ) Notice: Subject to any disclaimer, the term of this patent is extended or adjusted under 35 U.S.C. 154(b) by 153 days.

(21) Appl. No.: 16/337,216

(22) PCT Filed: Sep. 28, 2017

(86) PCT No.: PCT/IS2017/050012
§ 371 (c)(1),
(2) Date: Mar. 27, 2019

(87) PCT Pub. No.: WO2018/061038
PCT Pub. Date: Apr. 5, 2018

(65) Prior Publication Data
US 2019/0291140 A1    Sep. 26, 2019

(30) Foreign Application Priority Data
Sep. 28, 2016  (IS) .......................................... 050159

(51) Int. Cl.
*B07B 13/065*    (2006.01)
*B07B 1/46*    (2006.01)
*F16B 35/04*    (2006.01)

(52) U.S. Cl.
CPC .......... *B07B 13/065* (2013.01); *B07B 1/4636* (2013.01); *F16B 35/04* (2013.01)

(58) Field of Classification Search
CPC ....... B07B 13/065; B07B 13/07; B07B 13/18; A22C 25/04; A22C 25/08; A01K 61/95; F16B 35/04; F16B 35/041
(Continued)

(56) References Cited
U.S. PATENT DOCUMENTS

| 282,719 | A | * | 8/1883 | Gunckel | .................. B07B 1/14 |
| | | | | | 209/668 |
| 1,325,505 | A | * | 12/1919 | Bong | ....................... B07B 1/12 |
| | | | | | 209/394 |

(Continued)

FOREIGN PATENT DOCUMENTS

| JP | H11254235 A | 9/1999 |
| NO | 132917 B | 10/1975 |

(Continued)

OTHER PUBLICATIONS

International Search Report and Written Opinion of the International Searching Authority for PCT/IS2017/050012 dated Jan. 4, 2018.

(Continued)

*Primary Examiner* — Joseph C Rodriguez
(74) *Attorney, Agent, or Firm* — Heslin Rothenberg Farley & Mesiti P.C.

(57) ABSTRACT

The present invention relates to an apparatus for grading sensitive products. The apparatus treat the objects to be graded gently and is accurate and may be constructed so as to handle extremely large quantities. The grading device of the present invention has grading channels that are wider at the outlet than at the intake. The belt machine draws the objects forward between two inclined belts which form the channel. An adjusting device is implemented perpendicular underneath the belts of the apparatus comprising alternatively arranged support members and adjusting members arranged on an adjusting screwing shaft. Both components comprise screwing sections which regulates an increase or a decrease in the gap between the support members when the adjusting screwing shaft is rotated.

20 Claims, 6 Drawing Sheets

(58) Field of Classification Search
 USPC .................. 209/621, 622, 665, 668, 670
 See application file for complete search history.

(56) References Cited

U.S. PATENT DOCUMENTS

| | | | | |
|---|---|---|---|---|
| RE21,376 E | * | 2/1940 | Walma | B26D 1/52 |
| | | | | 83/751 |
| 2,314,479 A | * | 3/1943 | Christiansen | A22C 25/04 |
| | | | | 209/540 |
| 5,012,688 A | * | 5/1991 | Ellis | B07B 1/14 |
| | | | | 74/89.23 |
| 5,513,741 A | * | 5/1996 | Ellis | B07B 1/14 |
| | | | | 193/35 TE |
| 6,065,607 A | * | 5/2000 | Magnusson | B07B 13/065 |
| | | | | 209/665 |
| 6,321,914 B1 | * | 11/2001 | Magnusson | B07B 13/065 |
| | | | | 209/665 |
| 10,029,282 B2 | * | 7/2018 | Ragnarsson | B07B 13/065 |
| 2003/0156921 A1 | * | 8/2003 | Nagawa | F16B 33/02 |
| | | | | 411/411 |
| 2006/0039775 A1 | * | 2/2006 | Mizuno | F16B 25/0021 |
| | | | | 411/387.4 |

FOREIGN PATENT DOCUMENTS

| | | |
|---|---|---|
| WO | 96/41541 A1 | 12/1996 |
| WO | 98/48951 A1 | 11/1998 |
| WO | 2005/068094 A1 | 7/2005 |
| WO | 2006/120706 A1 | 11/2006 |
| WO | 2016/009452 A1 | 1/2016 |

OTHER PUBLICATIONS

Search Report for Icelandic Application No. 050159, dated Jan. 26, 2017.

* cited by examiner

ADJUSTMENT MECHANISM FOR GRADING SYSTEMS

CROSS REFERENCE TO RELATED APPLICATIONS

This application is a national stage filing under section 371 of International Application No. PCT/IS2017/050012, filed on Sep. 28, 2017, and published in English on Apr. 5, 2018 as WO 2018/061038, which claims priority to Iceland Application No. 050159, filed on Sep. 28, 2016. The entire contents of WO 2018/061038 are hereby incorporated herein by reference.

FIELD OF INVENTION

The present invention relates grading systems for grading objects, based on conveyor equipment with ridge-belts. The device makes it possible to adjust the gap width of such grading systems more precisely and accurately than current technology allows.

INTRODUCTION

The process of grading objects such as small and delicate marine species or fruit can be a problem due to their small size and the volume to be processed at each time and the fact that the quality of the food items deteriorates quickly upon rough handling procedures. An efficient grading process is therefore required based on selection criteria such as size and/or the sex.

Several different types of grading devices are known for grading fish and food items, which grade the items according to an assessment of their thickness. The known devices are based on belts and rollers as well as shaker-graders, which use several grading channels.

WO9641541 discloses a grading device based on specially-designed conveyor equipment so-called ridge-belts, which move the objects forwards without shaking or rubbing the items during the grading process. Such grading devices are designed so that the grading channels are narrower at the in-feed end (receiving end) than at the outlet end. This device allows for more gentle treatment of the objects to be graded, with a high processing rate. The problem solved by using this grading device is that the material is arranged into a single layer in optimal position onto the grading apparatus. This ensures that small items are not carried on top of larger items into a wrong grading compartment.

The adjustment of the channel width both at the intake and the outlet end is an important aspect of this technology. The channel width is set before the grading process is started, but sometimes the channel width needs to be adjusted or fine-tuned during the grading process. This requires a solution, where the channel width can be set before and during the grading process in a manner such that the channel width is the same between in all the channels on the grading device.

WO 2016/009452 discloses an adjusting unit for grading devices which is implemented perpendicular underneath the belts of the grading devices comprising alternatively arranged support members and adjusting members arranged on an adjusting screwing shaft. Both components comprise screwing sections which regulate an increase or a decrease in the gap between the support members when the adjusting screwing shaft is rotated.

A problem with the current technology is that the various components of the adjusting devices, especially the functional components that interact with each other by a screwing mechanism or gripping means are sensitive to the burden of weight, speed and side forces during adjustments of the device during operation take place. This strain on the adjusting devices frequently results in the parts get stuck or jam and the adjustment mechanism becomes dysfunctional.

SUMMARY OF THE INVENTION

The present invention provides a device for optimal adjustment of grading devices, which treat the objects to be graded gently and to provide a mechanism which is more accurate and easy to adjust during operation of the device. The grading device of the present invention has grading channels that are wider at the outlet than at the intake. The belt machine draws the objects forward between two inclined belts which form the channel, and if more channels are included in the same machine, each additional channel consists of an independent unit, i.e. another machine which is placed next to the first one. The machine takes the form of a conveyor belt which neither shakes the objects nor rubs them in the course of moving them, but moves them gently forward until the point where the gap becomes large enough for the object to fall through it.

The present invention in useful in industry, not only for the purpose of enabling the currently existing equipment to operate at the ideal level of throughput, but also as a new standard of concentration control for which future devices can be designed to exploit.

It is an object of the present invention to overcome or ameliorate the aforementioned drawbacks of the prior art and to provide an improved and/or alternative and/or additional device for automatic and continuous for grading of sensitive products, comprising a grading unit, where the grading unit comprises a plurality of endless ridge-belts arranged side by side and moved continuously in a forward direction, forming a gap there in-between, the gap being increased in the direction of movement, two adjacent belts receiving, conveying and releasing the products as the gap there between becomes greater than the product thickness into the receiving units, the ridge-belts being longitudinally supported by plurality of guide rails, and an adjusting unit or device, which is arranged underneath the ridge-belts and supporting guide rails, the adjusting unit is arranged for adjusting the distance between the ridge-belts. Moreover, it is a preferred object of the present invention to provide a setting or adjusting device comprising alternatively arranged support members and adjusting members where both components comprise screwing sections which regulate an increase or a decrease in the gap between the support members when an adjusting screwing shaft penetrating the adjusting members is rotated. It is also a preferred object of the present invention to provide improved screwing mechanisms for the support members and adjusting members as well as an improved structure of the inner hollow structure of the adjusting members and an improved guide member of the guide bar to better handle weight, burden and pressure.

The burden or pressure placed on the adjusting device and its components, especially the functional portions of the adjusting device is one or more of the following and a combination thereof: a) a horizontal pressure, b) a vertical pressure or burden, and c) lateral force. The weight of the belts and the movement of the belts place a pressure or burden (force) on the adjusting device of the present invention. As the components of the adjusting device such as the support members, the adjusting screwing members, the adjusting screwing shaft as well as the guide bar have functional components interacting with each other it is important that pressure or burden (force) does not restrict the function of these components. The components of the adjusting device have functional portions such as screw treads, gripping structures of parts or portions of these components and surfaces or apertures forming gripping portions of the components of the adjusting device. The burden or pressure (force) on the adjusting unit and its components can be various. First of all, the ridge belts and the guide rails are heavy on their own. Just the weight of the ridge belts and the guide rails applies a heavy weight on the adjusting device, even when the apparatus is not in operation. A vertical pressure is applied onto the adjusting device and thereby the adjusting shaft, which may cause the shaft to bend. When the shaft bends the interaction between screw threads of different components is put under strain and can easily jam or get stuck when the shaft is rotated to increase or decrease the gap between the belts. Furthermore, if the shaft to bends it has effect on the functional relationship between the shaft and the aperture or hollow structure in the adjusting screwing member which can hinder the functional relationship there between. A horizontal pressure is placed on the support members when the distance between ridge-belts is changed or when the belts arrive with distance between them that is different than the set distance of the adjusting unit. This alone puts a pressure on the support members and the other components they interact with through their functional portions and due to the weight of the ridge-belts and the movement of the belts, the effect on the whole adjusting unit is increased, where a horizontal thrust on the receiving supporting pin of the support member. As mentioned above this results in a lot of strain on the interaction between screw threads of different components and they can easily jam or get stuck. The same goes for the functional relationship between the shaft and the aperture or hollow structure in the adjusting screwing member. This also affects the functional relationship between the guide member of the guide bar and the recess of the guide section of the of the support member. A lateral force or pressure is applied on the adjusting unit when the grading apparatus is in operation, due to the movement of belt in a forward direction. This may cause the shaft to bend in a forward direction of the belts which has the same consequences as listed above.

The object(s) underlying the present invention is (are) particularly solved by the features defined in the independent claims. The dependent claims relate to preferred embodiments of the present invention. Further additional and/or alternative aspects are discussed below.

The adjustment device and the apparatus of the present invention for grading sensitive products using ridge belts and one or more adjusting devices provide a new and improved device for adjusting the distance between two adjacent belts receiving on a ridge belt grading conveyor before or more importantly during operation. The movement of the belts during operation, as well as the burden or weight of the belts results in a tremendous force on the supporting and adjustment mechanism of the grading device. It can be desirable to be able to change the distance between the belts along the grading conveyor during operation to better respond to changes in incoming objects or to solve problems when to many objects fall within the same present category. Problems with adjusting the distance between the belts of the grading apparatus during operation is the speed and the weight of the belts as explained above. In some embodiments of the present invention, the following features may be employed: a) use of modified square screw threads for the screwing section of the support members and the adjusting screwing members, where the corners of the crest rims have been rounded off, which provides the improved device resulting in a more accurate and jam-free adjustment of the grading device, b) by an improved hollow structure in the adjusting screwing members where arcs in the flat surfaces prevent the adjusting shaft to lock together in the hollow structure in the adjusting screwing members, and/or c) providing components in the guiding/sliding mechanism of the adjustment device with non-mating or non-matching corresponding shape to reduce friction between the recess of the guide section and the guide member and to prevent these components from locking together. These features may provide a new and improved solution.

The grading device as such is disclosed in WO9641541 and will not be discussed in detail herein.

Thus, at least one of the preferred objects of the present invention is solved by an adjusting device for a grading apparatus with a plurality of endless ridge-belts arranged side by side and moved continuously in a forward direction, forming a gap there in-between, the ridge-belts being longitudinally supported by plurality of guide rails. The adjusting device is arranged underneath the ridge-belts and supporting guide rails, for adjusting the distance between said ridge-belts. The adjusting device comprises; i) a plurality of support members, said support members comprising a cylindrical central section further comprising a first screwing section, the first screwing section being a double action inner elevated portion of the cylindrical central section forming a screw tread structure extending from the centre of the cylinder and towards each opening, ii) a plurality of adjusting screwing members, said adjusting screwing member being having a cylindrical shape and a second screwing section, the second screwing section being a double action outer elevated portion of a cylinder forming a screw tread structure extending from the centre of the cylinder and towards each end, said adjusting screwing member further comprising an inner hollow structure providing a grip for rotation, and iii) an adjusting screwing shaft, said adjusting screwing shaft being adapted to rotate said adjusting screwing member by penetrating the hollow structure of the adjusting screwing member having a shape providing gripping structure fitting in the circumference of the inner hollow structure of the adjusting screwing member. The support members and adjusting screwing members are alternately arranged in a perpendicular line to the guide rails, where each adjusting screwing member is and screwed into the support member on each side and where each support member is positioned underneath and corresponds to each guide rails. Furthermore, the second screwing section of the adjusting screwing member, interacts with said first screwing section of the support members upon rotation of said adjusting screwing shaft for increasing or decreasing the distance between adjacent support members and thereby said guide rails and said rigid belts. The first screwing section of the support member is a square screw thread where the corners of the crest rim have been rounded off, and in that the second screw section of the adjusting screwing member is a square screw thread where the corners of the crest rim have been rounded off.

Adjusting screwing members and support members are alternatively lined up underneath the guide rails. The second screwing member interacts with the first screwing section of the support members upon rotation of the adjusting screwing shaft in a manner increasing or decreasing the distance between adjacent support members and thereby the guide rails and the rigid belts. The inner hollow structure of the adjusting screwing member provides a grip for the adjusting screwing shaft adapted to rotate the adjusting screwing member, where the adjusting screwing shaft penetrating the adjusting screwing member has a shape corresponding to the circumference of the inner hollow structure of the adjusting screwing member.

The adjusting device of the present invention relates to adjusting screwing members and support members being alternatively lined up on an adjusting screwing shaft. Both the adjusting screwing members and support members have counter fitting screwing sections and pressure means are placed on each end of the adjusting screwing shaft.

The support members of the present invention relate to items, which support the guide rails as they pass the upper part of the grading device. The support member comprises a) central section with a screwing section, which will receive a counter fitting screwing section of an adjusting screwing member, b) a guide section which secures the support member in an upright, vertical position in order to hold up the guide rails and receiving section for receiving the guide rails, and c) a receiving section designed to fit into the lower section of the guide rails.

In an embodiment of the present invention the inner hollow structure of the adjusting screwing members, which provides a grip for rotation by the adjusting screwing shaft, has a circumference or cross section with corners such as, but not limited to triangular, rectangular, pentagonal, hexagonal, heptagonal, octagonal, as well as three-, four-, five-, six- or seven-armed stars. More specifically, the grip is formed by a combination of flat surfaces and corners between the flat surfaces.

In an embodiment of the present invention arcs are formed in the flat surfaces of the circumference of the hollow structure.

In an embodiment of the present invention the shape of the adjusting screwing shaft having gripping structures to rotate said adjusting screwing members is shaft with a triangular, rectangular, pentagonal, hexagonal, heptagonal, octagonal, as well as three-, four-, five-, six- or seven-armed star cross section. More specifically, the gripping structures are formed by a combination of flat surfaces and corners between the flat surfaces.

In an embodiment of the present invention the receiving section comprises a supporting pin forming the supporting portion of the support member and having a shape corresponding the guide rails.

In an embodiment of the present invention the device further comprises a guide bar with a guide member placed underneath the row of alternating support members and adjusting screwing members on the adjusting screwing shaft.

In an embodiment of the present invention the guide section comprises a recess which can receive the guide member of the guide bar.

In an embodiment of the present invention the recess of the guide section and the cross section of the guide member do not have a mating or matching shape to reduce friction between the recess of the guide section and the guide member. In such an embodiment the shape of the cross section of the guide member has lesser circumference than the shape of the recess of the guide section and where the two shapes have reduced mating surfaces.

In an embodiment of the present invention the recess of the guide section has a square shape.

In an embodiment of the present invention the guide member has a circular cross section.

In an embodiment of the present invention the receiving section further comprises a supporting pin forming the supporting portion of the receiving section and having a shape corresponding the guide rails. The support pin may comprises a metal pin screwed into the support member and a cap is placed over the first pin. The cap of the pin is made from material such as, but not limited to POM, plastic etc.

In an embodiment of the present invention the guide section comprises a hollow pin screwed into the first screwing section and a cap with a recess placed on the hollow pin.

The hollow pin comprises an outlet from the inner side of the first screwing section through the guide section. The cap of the guide section is made from material such as, but not limited to POM, plastic etc.

The adjusting device of the present invention may comprise a control device attached to the adjusting screwing shaft adapted for turning the adjusting screwing shaft and thereby increasing or decreasing the gap between the ridged belts. The control device can be a manual member such as a steering wheel, winch or the like, or it can be a motor.

The pressure means of the present invention relate to means placed on each end of the adjusting screwing shaft, which are adapted for applying pressure on the support members and the adjusting screwing members of the adjusting device from both sides. By applying pressure on the row of adjusting screwing members and support members, a rotation of the adjusting screwing shaft will allow the adjusting screwing members to either push the support members apart or together. The pressure can be applied by means of a coil spring or a spiral as well as an electrical jack or a hydraulic jack. The grading gap interval is thereby altered by the width of the adjusting screwing members and the width of the ridge-belts.

In an embodiment of the present invention a cover member being a pipe shaped member is provided. The cover member has an edge on each side forms a protrusion or a ring with larger circumference to fit into a groove on the support member to seal off the joining region of the support member and the adjusting screwing member. The second screwing member interacts with said first screwing section of the support members upon rotation of said adjusting screwing shaft in a manner increasing or decreasing the distance between adjacent support members and thereby said guide rails and said rigid belts.

Although the screw thread of the support member and the adjusting screwing member according to the present invention is finer than presented in the prior art devices, the elastic properties of the cover member apply a pushing and a pulling force between the support and adjusting members giving a more sensitive and accurate adjustment of the space between the support members and thereby the space between the ridge belts. Due to the nature of the device and the tasks it performs liquid and all sorts of debris will wash over the belts and remaining components of the grading apparatus.

According to the present invention one or more adjusting devices can be implemented on the grading apparatus, such as at the intake end and the outlet end of the grading apparatus. For example, one adjusting device can be placed at the intake end and another one in the middle of the device forming a small increase in gap width to the second adjusting device. A third adjusting device is then place at the outlet end of the grading apparatus with much larger gap width. This will allow for grading of smaller size objects into several categories and the collection of larger objects into one or two categories.

A control device or control mechanism is implemented on the adjusting device, coupled or attached to the adjusting screwing shaft, so that when the shaft is turned, the gap width is evenly adjusted. A control mechanism may comprise components such as, but not limited to; pressure means, f. ex. an electrical jack or a hydraulic jack; a motor, and a control board.

At least another preferred objects of the present invention is solved by an apparatus for grading of sensitive products, comprising a) a plurality of endless ridge-belts arranged side by side and moved continuously in a forward direction, forming a gap there in-between, the gap being increased in the direction of movement, two adjacent belts receiving, conveying and releasing the products as the gap there between becomes greater than the product thickness into the receiving units, the ridge-belts being longitudinally supported by plurality of guide rails, and b) one or more adjusting device/unit(s) arranged underneath the ridge-belts and supporting guide rails, the adjusting device being arranged for adjusting the distance between the ridge-belts. The adjusting device comprises; the distance between said ridge-belts, said adjusting device comprising; i) a plurality of support members, said support members comprising a cylindrical central section further comprising a first screwing section, the first screwing section being a double action inner elevated portion of the cylindrical central section forming a screw tread structure extending from the centre of the cylinder and towards each opening, ii) a plurality of adjusting screwing members, said adjusting screwing member being having a cylindrical shape and a second screwing section, the second screwing section being a double action outer elevated portion of a cylinder forming a screw tread structure extending from the centre of the cylinder and towards each end, said adjusting screwing member further comprising an inner hollow structure providing a grip for rotation, and iii) an adjusting screwing shaft, said adjusting screwing shaft being adapted to rotate said adjusting screwing member by penetrating the hollow structure of the adjusting screwing member having a shape providing gripping structure fitting in the circumference of the inner hollow structure of the adjusting screwing member. The support members and adjusting screwing members are alternately arranged in a perpendicular line to the guide rails, where each adjusting screwing member is and screwed into the support member on each side and where each support member is positioned underneath and corresponds to each guide rails. Furthermore, the second screwing section of the adjusting screwing member, interacts with said first screwing section of the support members upon rotation of said adjusting screwing shaft for increasing or decreasing the distance between adjacent support members and thereby said guide rails and said rigid belts. The first screwing section of the support member is a square screw thread where the corners of the crest rim have been rounded off, and in that the second screw section of the adjusting screwing member is a square screw thread where the corners of the crest rim have been rounded off.

In an embodiment of the present invention the adjusting device is controlled by an industrial computer.

In an embodiment of the present invention the grading device further comprises an in-feed device.

In an embodiment of the present invention the grading device further comprises receiving unit.

In the present context the term "functional portions" of the adjusting device relates to the functional parts of the support members, the adjusting screwing members and the adjusting screwing shaft. Furthermore, the functional portions of these parts are the i) screw threads and the interaction between the screw threads, ii) the hollow structure of the adjusting screwing members and adjusting screwing shaft and more specifically the gripping portion of the hollow structure and the gripping means of the shaft formed by the shape of the hollow structure and the cross section of the shaft, and iii) the shape of the recess in the of the guide section of the support member and the cross section of the guide member of the guide bar.

In the present context the terms "adjusting device" or "adjusting unit" are used for the setting or adjusting device of the invention, which is placed under the guide rails and the running ridge belts of a grading machine to adjust or set the gap between the belts of the grading apparatus.

The gap size between the ridge belts is then set by using the control board, which can be a simple electrical control board attached to the grading device, having control buttons which rotate the adjusting screwing shaft in each direction as well as controlling the speed of the grading device and the in-feed device. The control board can further be a wireless remote control or an industrial computer, which co-ordinates the turning of the adjusting screwing shaft by the motor and the pressure applied by the pressure means.

An adjustment device as disclosed here is implemented on the in-feed end as well as on the outlet end of the grading device and as they are individually controlled, the gap width of each end can be altered without affecting the other.

BRIEF DESCRIPTION OF DRAWINGS

The present invention will be further described with reference to the drawings using reference numbers in the drawings to identify the individual components of the invention.

DETAILED DESCRIPTION OF THE PRESENT INVENTION

In the following, exemplary embodiments of the invention will be described, referring to the figures. These examples are provided to provide further understanding of the invention, without limiting its scope.

In the following description, a series of steps are described. The skilled person will appreciate that unless required by the context, the order of steps is not critical for the resulting configuration and its effect. Further, it will be apparent to the skilled person that irrespective of the order of steps, the presence or absence of time delay between steps, can be present between some or all of the described steps.

Figure 1:
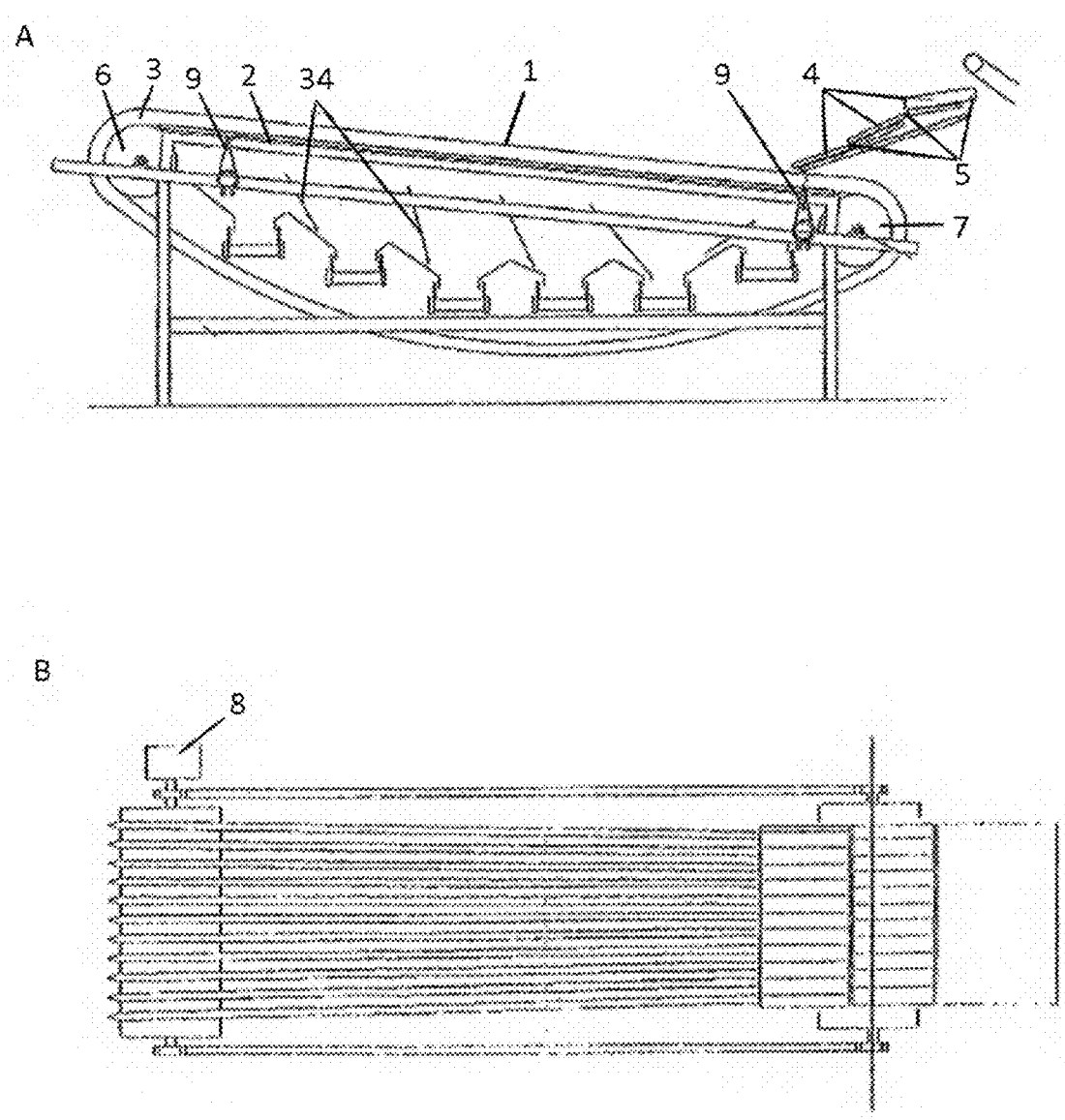
FIG. 1 shows a side view (A) of the equipment designed for the grading of smaller fish species and relatively light objects. A top view (B) of the same equipment.

FIG. 1 shows a side-view of the grading device (1). In FIG. 1A the objects to be graded are placed onto an in-feed device (step-channel) (4). As the objects slide downwards, they assume the optimal position before sliding onto the ridge-belts (3). If the objects are not adversely affected by contact with water, a water-pipe (5) is used to direct a film of water onto the step-channel, which makes the objects quicker to assume the optimal position. The gradient of the step-channel (4) is set so that the speed of the objects as they enter the grading gaps is as close as possible to the speed of the ridge-belts. The ridge-belts (3) run along guide-rails (2) and the guide-rails (2) rest on the adjusting device (9) attached to an adjusting screwing shaft. The number of ridge-belts may be from 2 to over 30 according to the processing rate required of the grader. The guides are shown with an upward incline in the figure, but they may be horizontal or inclined downwards, depending on what is found suitable at any given time. Between the ridge-belts (3) are formed the grading gaps, the number of which is one fewer than the number of ridge-belts. Below the ridge-belts (3) are cross-plates (34) for guiding and dividing graded objects between size categories.

The ridge-belts (3) as driven by the drive drum (6), frictional resistance between the drum and the belts being sufficient to drive the belts; if it is not sufficient, e.g. in the case of long machines or heavy items, then the drum is covered with object with a high friction resistance or with pins which engage in the ridges and so drive them. Drum (7) is a free drum which guides the belts into the guide slots in the belt guides.

In FIG. 1B, a light-construction grading machine seen from above, showing the motor (8) which drives the drive drum. It is desirable that the motor should be speed-adjustable, but whether it is a hydraulic motor or an electric motor is immaterial. A gear motor may be used after the machine has been set and the object to be graded is always of the same type. FIG. 1B shows a grading machine with 11 ridge belts (3), where the gap between the belts at the in-feed end below the in-feed device (4) is smaller than at the outfeed end.

Figure 2:
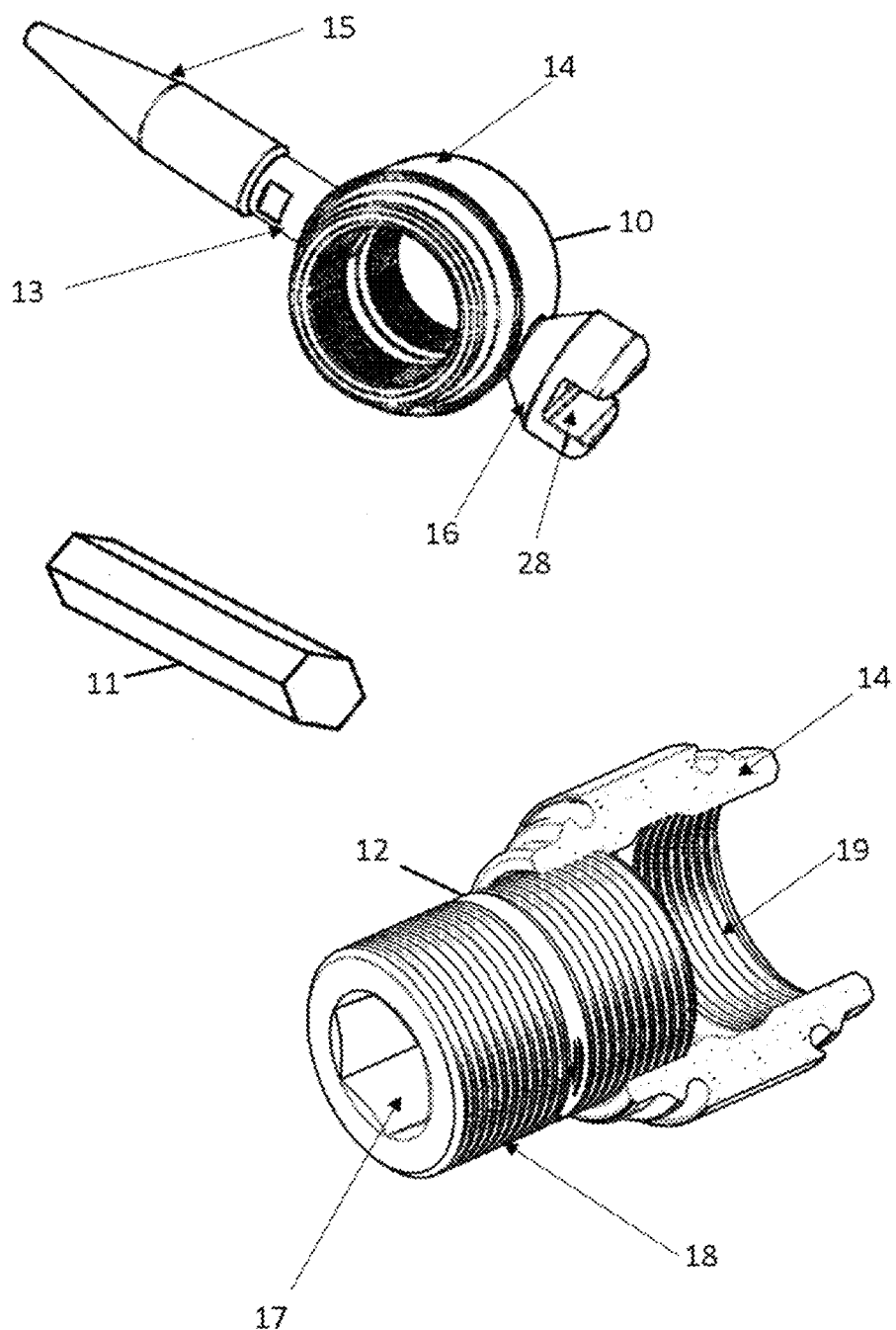
FIG. 2 shows the individual components of the adjusting means of the present invention.

FIG. 2 discloses the individual components of the adjusting means of the present invention, a support member (10), a adjusting screwing shaft (11), an adjusting screwing member (12). Each support member (10) comprises a central section (14), a receiving section (13) and a guide section (16). The central section (14) has a cylindrical shape, where the inner surface forms a screw tread structure from the centre of the cylinder and towards each opening. The guide section (16) is shown here having a recess (28) to be placed on a guide bar. A supporting pin (15) of the receiving section (13) is adapted to fit into the slot of the lower part of the guide rail.

The adjusting screwing member (12) has a circular outer structure, where the inner surface (17) has a shape corresponding to the outer circumference of the adjusting screwing shaft (11), in order to fit onto the adjusting screwing shaft (11) as assembled. The circular outer structure of the adjusting screwing member (12) comprises a second screwing section (18), which is essentially an elevated portion having screw shaped form extending from the centre to each end of the circular structure. The central section (14) has a cylindrical shape, where the inner surface comprises an elevated portion (19), which is an elevated portion forming a screw tread structure (first screwing section) from the centre of the cylinder and towards each opening. In the embodiment shown in FIG. 2, the inner surface shape is hexagonal, corresponding to the shape of the adjusting screwing shaft of this particular embodiment.

The corners of shaft provide a gripping structure to grip the corresponding gripping corners of the inner surface (17) of the screwing member. In the embodiment shown in FIG. 2, the shape of the adjusting screwing shaft (11) is hexagonal corresponding the shape of the inner surface if the adjusting screwing member (12). By using an inner circumference of a shape such as triangular, square, pentagonal and hexagonal, a grip is provided for a member (adjusting screwing shaft) so when the adjusting screwing shaft is rotated the adjusting screwing member is rotated or turned as well.

Figure 3:
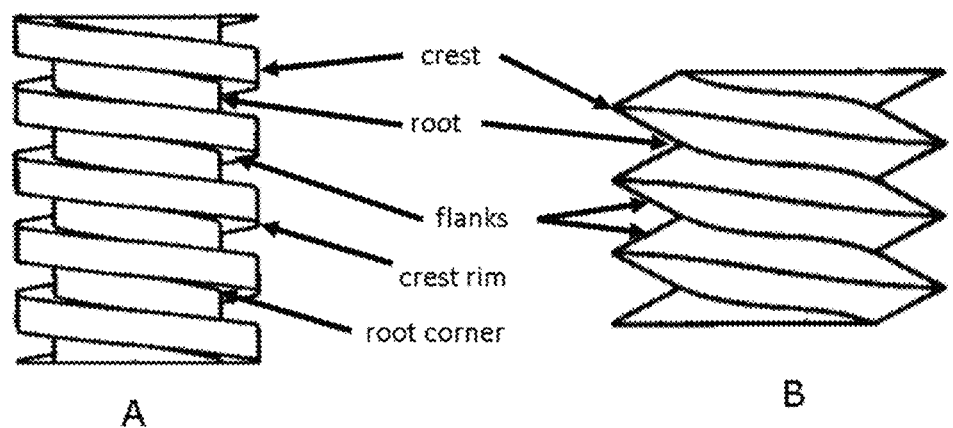
FIG. 3 outlines the terminology for square screw threads (A) and V-screw threads (B).

FIG. 3 outlines the terminology for screw threads, both square threads (A) and V-screw screw threads (B). The elevated portion of the tread is referred to as a crest and the indent is referred to as a root. The sides between the crest and the root is referred to as flanks. For the purpose of further defining important aspects of the present invention the crest rim is shown as the corner where the crest meets the clank and the root corner is the portion where the root meets the flank.

Figure 4:
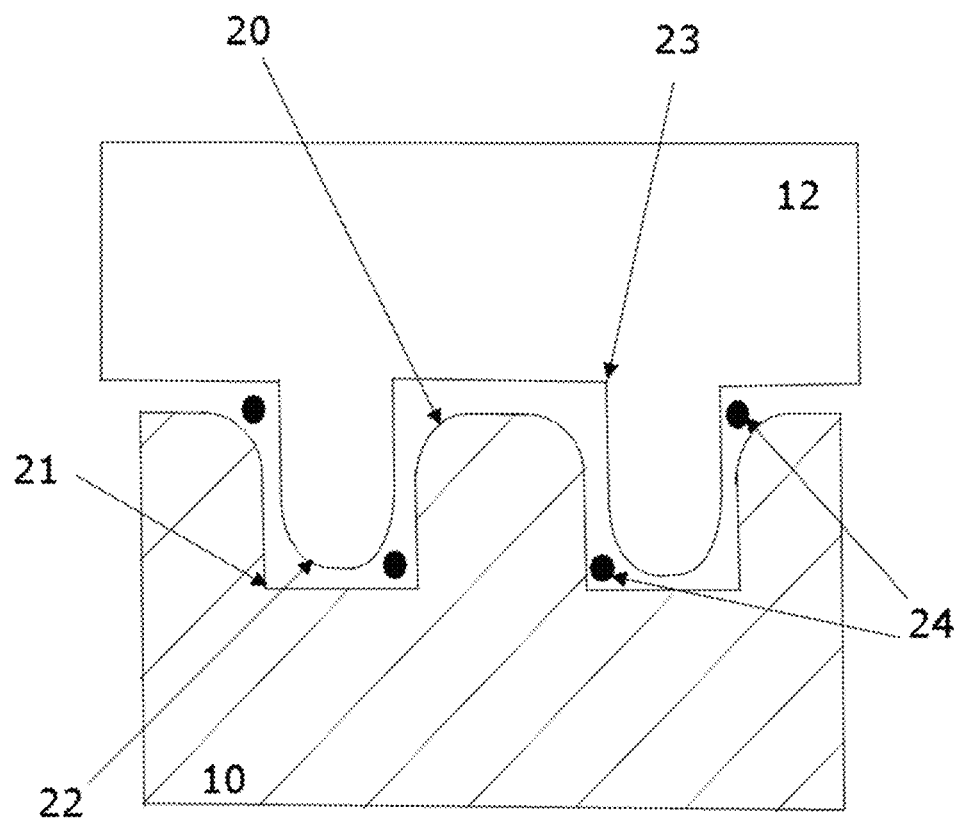
FIG. 4 shows the formation and interaction of the square of the screw threads of the invention.

FIG. 4 shows the square formation of the screw threads of the support member (10) and the adjusting screwing member (12). The corner of the crest rim 20 of the first screwing section (19) in the support member (10) is rounded off in order to provide a less rigid structure when the two screw threads come together. The root corner (21) of the first screw section (19) of the support member (10) is however rectangular. The corner of the crest rim (22) of the second screwing section (18) in the adjusting screwing member (12) is rounded off in order to provide a less rigid structure when the two screw threads come together. Furthermore root corner (23) of the second screw section (18) of the adjusting screwing member (12) is rectangular. The shape shown in FIG. 4 provides less friction when the adjusting screwing shaft (11) is being rotated. The points of free space (24) provided by the new screw thread of the present invention are shown in the drawing.

Figure 5:
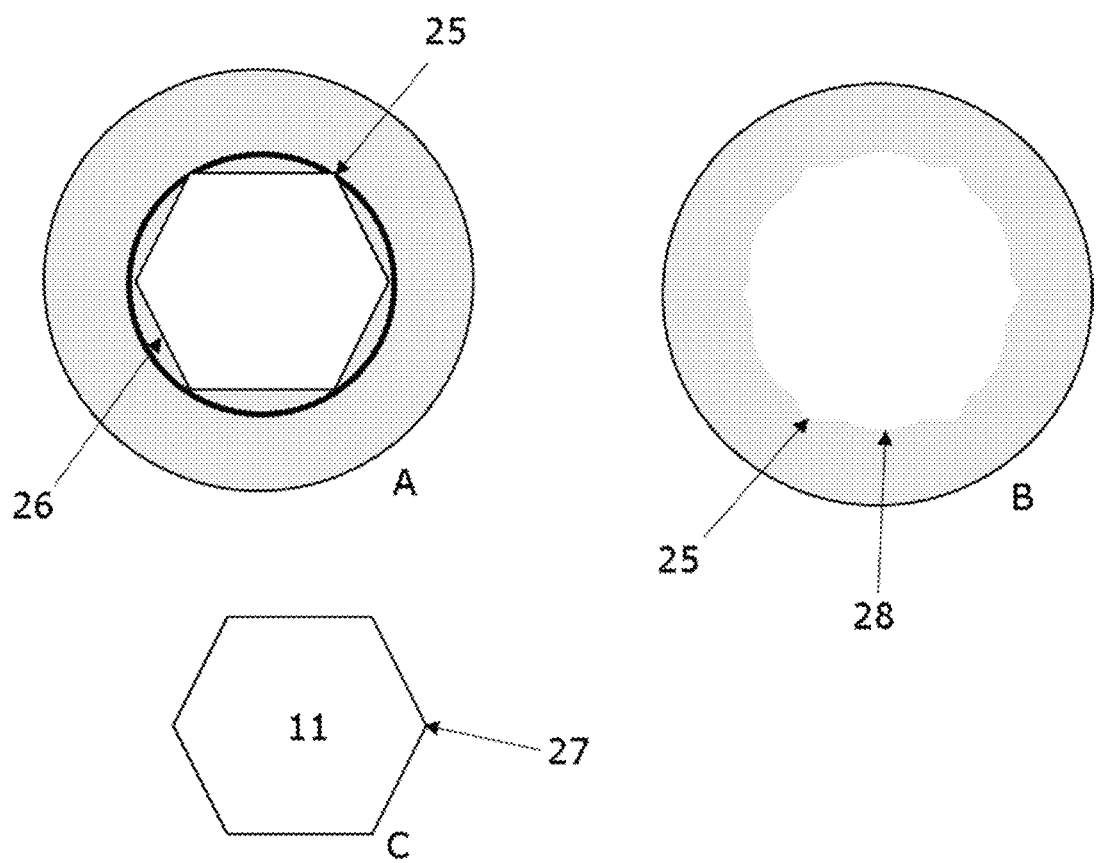
FIG. 5 shows a cross section of the adjusting screwing member, prior art (A), of the present invention (B) and of the adjusting screwing shaft (C).

FIG. 5 shows a cross section of the adjusting screwing member (12). In FIG. 5A the inner surface (17) has a hexagonal shape to provide a grip for the adjusting screwing shaft (11) shown in FIG. 5C, having a hexagonal corresponding shape. The corners (25) of the hexagonal inner surface (17) between the flat surfaces (26) provide grip for the gripping corners (27) of the adjusting screwing shaft (11). The adjusting screwing member (12) in FIG. 5B is formed in the same manner as the adjusting screwing member (12) in FIG. 5A, but arcs (28) are formed in the flat surfaces (26) of the hexagonal circumference to reduce friction when the adjusting device (9) is subjected to the weight of the belts and side forces between each support member. This is further outlined in FIG. 7

Figure 6:
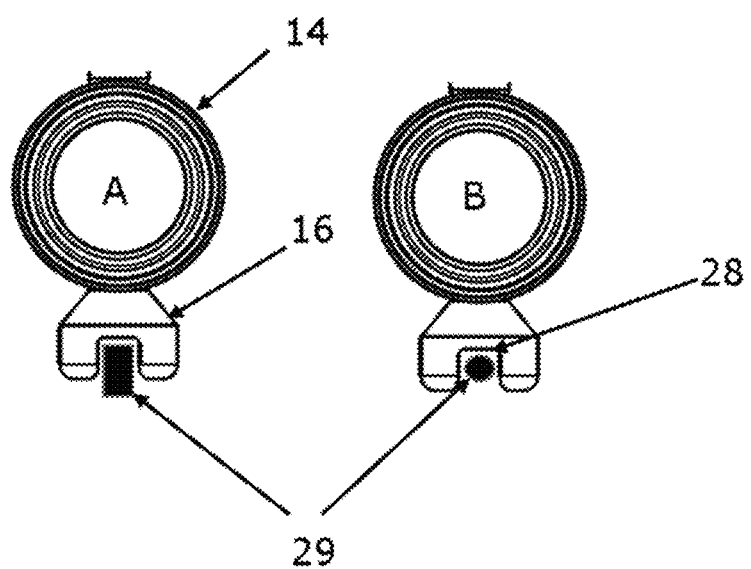
FIG. 6 shows a cross sectional side view of the guide section of the support member guide members, prior art (A) and of the present invention (B).

FIG. 6 shows a cross section view of the central section (14) and the guide section (16) of the support member (10). The recess (28) in the guide section is for receiving a guide member (29) of a guide bar (30). The recess (28) of a prior art adjusting unit (9) in the guide section shown in FIG. 6A is rectangular for receiving a rectangular guide member (29). The guide member (29) shown in FIG. 6B has a circular cross section in order to reduce friction between the recess (28) of the guide section (16) and the guide member (29), as the adjusting screwing shaft is turned in each direction and the adjusting screwing members (12) pull the support members (10) together and the gap between them decreases or increases based on the direction of screwing.

Figure 7:
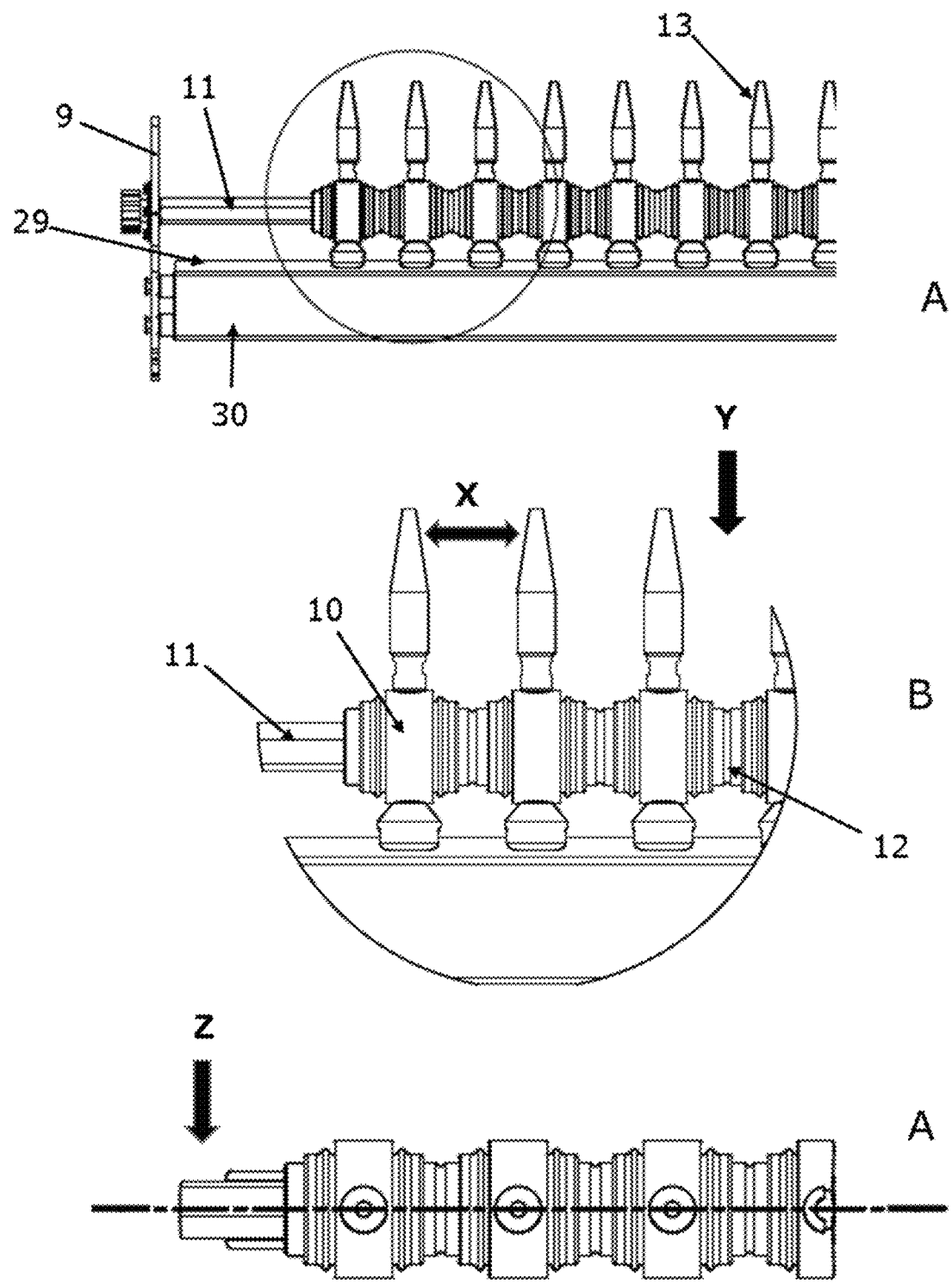
FIG. 7 shows the grading unit for setting the gap-width on the in-feed and the outlet end of the grading device and different burden or pressure on the grading device.

FIG. 7 outlines the adjusting unit 9 for setting the gap-width on the in-feed and the outlet end of the grading device. What is shown is a front view (A) of the adjusting unit (9), an enlargement (B) of a part of the adjusting unit, a top view (C) of FIG. 4 B. In FIGS. 7A and B the alternating row of the support members (10) and the adjusting screwing members (12) on the adjusting screwing shaft (11). The guide member (29) of the guide bar (30) is placed underneath the row of support members (10) and adjusting screwing members (12), where the guide member (29) sits in the recess of the guide section (16) of the support member (10) and the receiving section (13) extends upwardly to receive the guide rails (not shown). More specifically, as shown in FIG. 7B, the adjusting screwing members (12) are positioned on adjusting screwing shaft (11) between the support members (10). The adjusting screwing members (12) are secured on the adjusting screwing shaft (11) due to the shape of the inner surface of the adjusting screwing members (12), corresponding the shape of the adjusting screwing shaft. Each first screwing section of the adjusting screwing member is adapted to fit into the first central section of the support member (10), so that when the adjusting screwing shaft is turned the second screwing section of the adjusting screwing member (12) is either screwed into or out of the support member (10) and thereby altering the distance between each two support members (10). One support member (10) is provided for each ridge belt (3) and adjusting screwing member (12), is placed between each two support members (10), on the adjusting screwing shaft (11). Each side of the row comprising support members (10) and adjusting screwing members (12) is terminated with a support member (10). Outside the support member (10) is a pressure means. A control device adapted to turn the adjusting screwing shaft (11) is positioned on one side of the adjusting screwing shaft (11) behind the coil spring.

Figure 8:
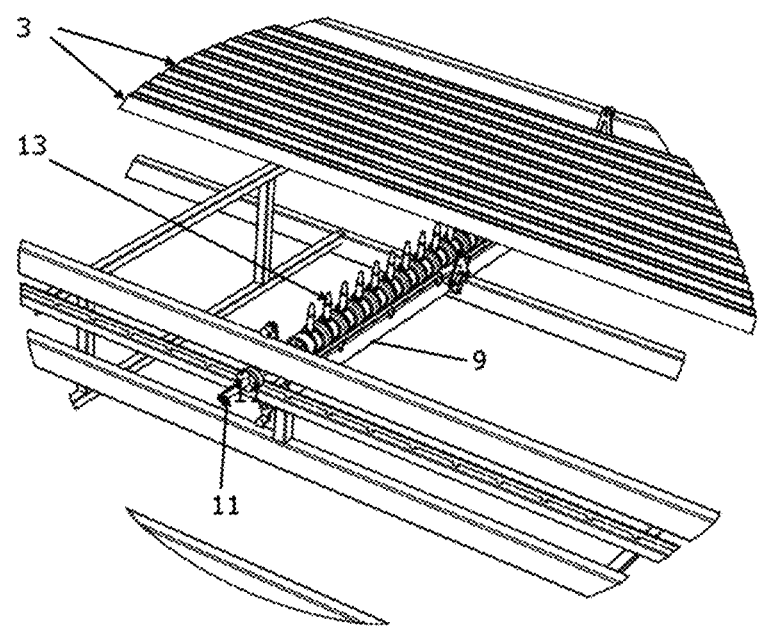
FIG. 8 shows the grading unit under the ridge belts under the grading device.

FIGS. 7 B and C also show the burden or pressure on the adjusting unit (9) and its components. In FIG. 7B the horizontal pressure (X) on the support members is shown when the distance between ridge-belts (3) is changed. Due to the weight of the ridge-belts (3) and the movement of the belts, pressure is applied on the whole adjusting unit (9) by a horizontal thrust on the receiving section (13) of the support member (10). The vertical force (Y) on the adjusting unit (9) is also shown in FIG. 7B. Due to the weight of the ridge-belts (3) a vertical force is applied on the adjusting unit (9) and specifically the functional portions of the of the adjusting unit (9), namely the support members (10), the adjusting screwing members (12) and the adjusting screwing shaft (11). The lateral force on the (Z) on the adjusting unit (9) is shown in FIG. 7C when the grading apparatus is in operation. Due to the movement of belt a forward force is applied on the adjusting unit (9) and its functional portions FIG. 8 shows a view of an adjusting device/unit (9) under the ridge belts of a grading device. The receiving supporting pins (15) of the support members extent upwardly from the adjusting unit (9) being rotated by the shaft (11). The ridge belts (3) sit on the support pins (15) via the guide rails (not shown). A plurality of such adjusting units can be placed under the belts in the sorting direction of the belt to adjust the gap between the belts along the sorting distance. Furthermore, a plurality of adjusting units can be placed under the belts in the returning direction of the belt to adjust the gap between the belts before they return to grading function.

Figure 9:
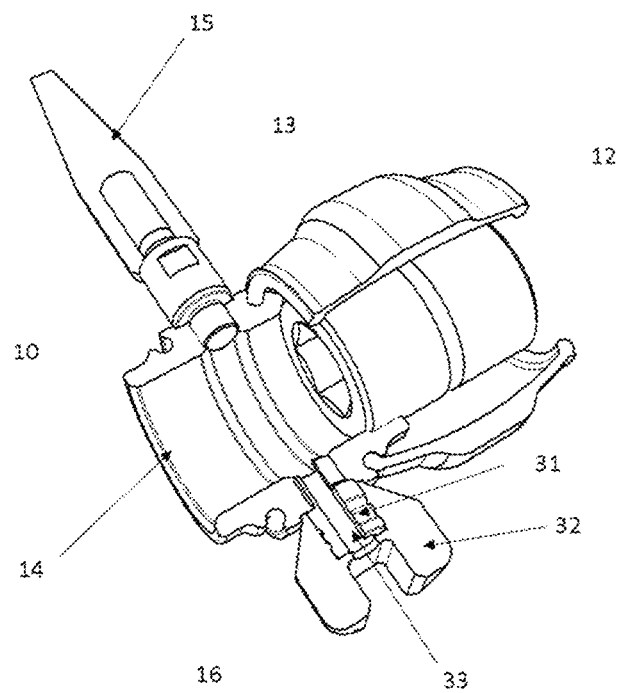
FIG. 9 showing a perspective view of the individual components as assembled and a cross section of the support member.

FIG. 9 shows a perspective view of the individual components and a cross section of the support member (10), comprising the central section (14), the guide section (16) and the receiving section (13). The figure also shows the screwing member (12), and a cross section of the cover member (35) and the guide section (16). The guide section is formed by a hollow pin (31) screwed into the central section (14) and a cap with a recess (32) placed on the hollow pin (31). An outlet (33) is therefore formed from the inner side of the first screwing section (14) through the guide section (16), but this will evacuate water and air pressure from the adjusting device releasing stress, reducing humidity and making cleaning more simple and efficient. The receiving section (13) further comprises a supporting pin (15) to receive and support the guide rails.

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components.

The present invention also covers the exact terms, features, values and ranges etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

The term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

It will be appreciated that variations to the foregoing embodiments of the invention can be made while still falling within the scope of the invention can be made while still falling within scope of the invention. Features disclosed in the specification, unless stated otherwise, can be replaced by alternative features serving the same, equivalent or similar purpose. Thus, unless stated otherwise, each feature disclosed represents one example of a generic series of equivalent or similar features.

Use of exemplary language, such as "for instance", "such as", "for example" and the like, is merely intended to better illustrate the invention and does not indicate a limitation on the scope of the invention unless so claimed. Any steps described in the specification may be performed in any order or simultaneously, unless the context clearly indicates otherwise.

All of the features and/or steps disclosed in the specification can be combined in any combination, except for combinations where at least some of the features and/or steps are mutually exclusive. In particular, preferred features of the invention are applicable to all aspects of the invention and may be used in any combination.

The invention claimed is:

1. An adjusting device for a grading apparatus with a plurality of endless ridge-belts arranged side by side and moved continuously in a forward direction, forming a gap there in-between, the ridge-belts being longitudinally supported by plurality of guide rails, said adjusting device being arranged underneath the ridge-belts and supporting guide rails, for adjusting the distance between the ridge-belts, said adjusting device comprising:

a plurality of support members, said support members comprising a cylindrical central section further comprising a first screwing section, the first screwing section being a double action inner elevated portion of the cylindrical central section forming a screw thread structure extending from the centre of the cylindrical central section and towards each opening, a plurality of adjusting screwing members, said adjusting screwing member having a cylindrical shape and a second screwing section, the second screwing section being a double action outer elevated portion of a cylinder forming a screw thread structure extending from the centre of the cylindrical central section and towards each end, said adjusting screwing member further comprising an inner hollow structure providing a grip for rotation, and an adjusting screwing shaft, said adjusting screwing shaft being adapted to rotate said adjusting screwing member by penetrating the inner hollow structure of the adjusting screwing member having a shape providing gripping structure fitting in the circumference of the inner hollow structure of the adjusting screwing member, wherein support members and adjusting screwing members are alternately arranged in a perpendicular line, where each adjusting screwing member is screwed into the support member on each side and where each support member is positioned underneath and corresponds to each guide rails, wherein said second screwing section of the adjusting screwing member, interacts with said first screwing section of the support members upon rotation of said adjusting screwing shaft for increasing or decreasing the distance between adjacent support members and thereby said guide rails and said rigid belts, wherein the first screwing section of the support member is a square screw thread where the corners of the crest rim have been rounded off, and in that the second screw section of the adjusting screwing member is a square screw thread where the corners of the crest rim have been rounded off, and wherein a root corner of the first screw section of the support member and root corner of the second screw section of the adjusting screwing member are rectangular to provide less friction when the adjusting screwing shaft is being rotated.

2. The adjusting device according to claim 1, wherein the inner hollow structure of the adjusting screwing members providing a grip for rotation by the adjusting screwing shaft has a circumference with corners such as triangular, rectangular, pentagonal, hexagonal, heptagonal or octagonal.

3. The adjusting device according to claim 2, wherein arcs have been formed in flat surfaces of the circumference of the inner hollow structure.

4. The adjusting device according to claim 2, wherein the shape of the adjusting screwing shaft providing a grip to rotate said adjusting screwing members is a shaft with a triangular, rectangular, pentagonal, hexagonal, heptagonal or octagonal cross section.

5. The adjusting device according to claim 1, wherein the support member further comprises:
   a guide section securing the support member in an upright position, and
   a receiving section for receiving the guide rails.

6. The adjusting device according to claim 5, wherein the receiving section further comprises a supporting pin forming a supporting portion of the receiving section and having a shape corresponding the guide rails.

7. The adjusting device according to claim 1, wherein the adjusting device further comprises a guide bar with a guide member placed underneath a row of alternating support members and adjusting screwing members on the adjusting screwing shaft.

8. The adjusting device according to claim 5, wherein the adjusting device comprises a guide bar with a guide member placed underneath a row of alternating support members and adjusting screwing members on the adjusting screwing shaft, and wherein the guide section comprises a recess which can receive the guide member of the guide bar.

9. The adjusting device according to claim 8, wherein the recess of the guide section and the cross section of the guide member does not have a mating shape, and wherein the shape of the cross section of the guide member has lesser circumference than the shape of the recess of the guide section and where the two shapes have reduced mating surfaces.

10. The adjusting device according to claim 9, wherein recess of the guide section has a square shape.

11. The adjusting device according to claim 8, wherein said guide member has a circular cross section.

12. The adjusting device according to claim 1, further comprising a pressure component on each end of the adjusting screwing shaft adapted for applying pressure on the adjusting device from both sides, wherein the pressure component is selected from a coil spring, a spiral, and a jack.

13. The adjusting device according to claim 12, wherein the pressure component is coil spring or a spiral.

14. The adjusting device according to claim 12, wherein the pressure component is an electrical jack or a hydraulic jack.

15. The adjusting device according to claim 1, comprising a control device attached to an adjustment pin adapted for turning the adjusting screwing shaft.

16. The adjusting device according to claim 15, wherein the control device is a motor.

17. An apparatus for grading sensitive products, comprising:
   a plurality of endless ridge-belts arranged side by side and moved continuously in a forward direction, forming a gap there in-between, the gap being increased in the direction of movement, two adjacent belts receiving, conveying and releasing the products as the gap there between becomes greater than the product thickness into said receiving units, the ridge-belts being longitudinally supported by plurality of guide rails, and
   one or more adjusting device(s) arranged underneath the ridge-belts and supporting guide rails, said adjusting device arranged for adjusting the distance between the ridge-belts, said adjusting device comprising:
   a plurality of support members, said support members comprising a cylindrical central section further comprising a first screwing section, the first screwing section being a double action inner elevated portion of the cylindrical central section forming a screw thread structure extending from the centre of the cylindrical central section and towards each opening,
   a plurality of adjusting screwing members, said adjusting screwing member being having a cylindrical shape and a second screwing section, the second screwing section being a double action outer elevated portion of a cylinder forming a screw thread structure extending from the centre of the cylindrical central section and towards each end, said adjusting screwing member further comprising an inner hollow structure providing a grip for rotation, and
   an adjusting screwing shaft, said adjusting screwing shaft being adapted to rotate said adjusting screwing member by penetrating the inner hollow structure of the adjusting screwing member having a shape providing gripping structure fitting in the circumference of the inner hollow structure of the adjusting screwing member, wherein support members and adjusting screwing members are alternately arranged in a perpendicular line, where each adjusting screwing member is screwed into the support member on each side and where each support member is positioned underneath and corresponds to each guide rails, wherein said second screwing section of the adjusting screwing member, interacts with said first screwing section of the support members upon rotation of said adjusting screwing shaft for increasing or decreasing the distance between adjacent support members and thereby said guide rails and said rigid belts, wherein the first screwing section of the support member is a square screw thread where the corners of the crest rim have been rounded off, and in that the second screw section of the adjusting screwing member is a square screw thread where the corners of the crest rim have been rounded off, root corner of the first screw section of the support member and the root corner of the second screw section of the adjusting screwing member are rectangular to provide less friction when the adjusting screwing shaft is being rotated.

18. The apparatus according to claim 17, wherein two or more adjusting devices are arranged underneath the ridge-belts and the supporting guide rails.

19. An apparatus according to claim 17, wherein each adjusting device is controlled by an industrial computer.

20. The apparatus according to claim 17, wherein one or more adjusting devices are arranged under a returning portion of the ridge-belts.

* * * * *